United States Patent Office

3,514,479
Patented May 26, 1970

---

3,514,479
PROCESS FOR PREPARING N,N'-DISUBSTITUTED-N-HYDROXY THIOUREAS
Rudiger D. Haugwitz, New Haven, and Guenter K. Weisse, Northford, Conn., assignors to Olin Mathieson Chemical Corporation, a corporation of Virginia
No Drawing. Filed Feb. 24, 1969, Ser. No. 801,822
Int. Cl. C07c *153/05*
U.S. Cl. 260—502.6                                5 Claims

---

ABSTRACT OF THE DISCLOSURE

Selected N,N' - disubstituted-N-hydroxy thioureas are provided by reacting an hydroxylamine having the formula RNHOH wherein R is cycloaliphatic or aryl with carbon disulfide in the presence of a partially water-soluble or water-miscible aprotic solvent at a temperature of about 0° to about 45° C.

---

This invention relates to a process for preparing selected N,N' - disubstituted - N - hydroxy thioureas. More particularly, this invention relates to a process for preparing compounds having the formula

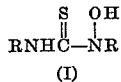

(I)

wherein R is a cycloaliphatic or aryl moiety.

The N,N'-disubstituted-N-hydroxy thioureas (I) are valuable biocides, having particular utility in the fields of textiles, starches and cosmetics. For example, generally about 10 p.p.m. of compound (I) is effective to preserve aqueous starch dispersions from fungal and bacterial growth.

Various N,N'-disubstituted-N-hydroxy thioureas have been previously prepared by reacting an hydroxylamine with an isothiocyanate. For example, E. Beckmann, J. pr. Chemie 164, 71 (1897), reports the preparation of N-hydroxy-N,N'-diphenyl thiourea from phenyl hydroxylamine and phenyl isothiocyanate. While providing the desired N,N' - disubstituted - N - hydroxy thioureas, the aforementioned process is commercially unattractive in view of the costliness of the isothiocyanate reactant.

Now it has been found in accordance with this invention that various N,N'-disubstituted-N-hydroxy thioureas can be readily and economically provided by reacting an appropriate hydroxylamine with carbon disulfide under selected reaction conditions. It is postulated that the reaction proceeds in accordance with the following general equation, wherein R is as previously described:

$$2RNHOH + CS_2 \rightarrow (I) + S + H_2O$$

(II)

The preparation of N,N'-disubstituted-N-hydroxy thioureas (I) according to the process of this invention is particularly surprising and unexpected since it has been found that methyl hydroxylamine and carbon disulfide do not form an N,N'-disubstituted thiourea when subjected to the reaction conditions of this invention.

Many of the hydroxylamines (II) employed herein are readily available materials. Those hydroxylamines that are not commercially available are provided by reduction of the corresponding nitro compound with zinc dust and ammonium chloride according to the conventional process described in Organic Synthesis, (John Wiley and Sons, Inc., 1948), H. Gilman, Coll., vol. I, 445.

Illustrative hydroxylamines include those compounds having the Formula II wherein R is a cycloaliphatic having 5–8 carbon atoms, phenyl, halophenyl, cyanophenyl (and preferably monocyanophenyl), nitrophenyl (and preferably mono- and dinitrophenyl), lower alkoxy, i.e., alkoxy having 1–4 carbon atoms, phenyl (and preferably mono(lower)alkoxy phenyl), tolyl or xylyl.

Exemplificative of these hydroxylamines are cyclopentyl hydroxylamine, cyclohexyl hydroxylamine, cyclooctyl hydroxylamine, N-bornyl hydroxylamine, p-chlorophenyl hydroxylamine, p-fluorophenyl hydroxylamine, pentachlorophenyl hydroxylamine, m-cyanophenyl hydroxylamine, p-nitrophenyl hydroxylamine, 2,4-dinitrophenyl hydroxylamine, p-methoxy phenyl hydroxylamine, m-ethoxy phenyl hydroxylamine, m-tolyl hydroxylamine, p-xylyl hydroxylamine, etc. Particularly preferred hydroxylamines suitable for use in the preparation of compounds having the Formula I are those compounds (II) wherein R is cycloaliphatic having 5–6 carbon atoms, phenyl or tolyl.

The process of this invention is carried out in the presence of a partially water-soluble or water-miscible aprotic solvent. Solvents of this nature are known to those skilled in the art, having been described, for example, in Reagents for Organic Synthesis, (John Wiley and Sons, Inc., 1967) C. F. Fieser and M. Fieser, p. 1110. Illustrative solvents include N,N'-dialkyl carboxamides of the formula

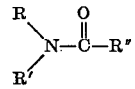

wherein R and R' are each alkyl (preferably lower alkyl having 1–4 carbon atoms) and R" is hydrogen or alkyl (preferably lower alkyl). Dimethylformamide, diethylformamide and dimethylacetamide are representative compounds of this group.

Other suitable partially water-soluble or water-miscible aprotic solvents include N-alkyl lactams such as N-alkyl-ε-caprolactams and N-alkyl pyrrolidones. Esters such as methyl formate, ethyl acetate, ethyl propionate, isobutyl acetate, and n-butyl acetate can be advantageously employed.

Additional solvents include ethers such as diethyl ether, dioxane, diglyme, triglyme, etc.; ketones such as methyl ethyl ketone; sulfoxides such as dimethyl sulfoxide, etc.

The process of this invention is carried out at a temperature of about 0° to about 45° C., the reflux temperature of carbon disulfide. While the reaction proceeds satisfactorily at atmospheric pressure, it is apparent that pressure equipment can be effectively utilized.

The desired N,N' - disubstituted - N-hydroxy thioureas are readily obtained in high yield and excellent purity and are isolated by conventional techniques, such as filtration, crystallization, and the like.

The following examples will serve to illustrate the process of this invention.

EXAMPLE 1

A mixture of 0.5 g. cyclohexyl hydroxylamine and 15 ml. carbon disulfide in 2 ml. dimethylformamide was refluxed on a steam bath for 90 minutes. Then the carbon disulfide was evaporated from the reaction mixture and water added to the residue. Filtration provided a solid product which was crystallized from ethyl ether/petroleum ether (B.P. 30°–60° C.) to yield 0.46 g. of N,N'-di-(cyclohexyl)-N-hydroxy thiourea, M.P. 147° C.

*Analysis.*—Calcd. for $C_{13}H_{24}N_2OS$ (percent): C, 60.89; H, 9.43; N, 10.93. Found (percent): C, 61.19; H, 9.65; N, 11.01.

EXAMPLE 2

A mixture of 1.3 g. of phenyl hydroxylamine and 2 ml. of carbon disulfide in 2 ml. dimethylsulfoxide was stirred at room temperature for 24 hours. After evaporation of the carbon disulfide, water was added to the residue. Filtration provided 0.9 g. of solid product which was crystallized from ethyl ether/petroleum ether (B.P. 30°–60° C.) to yield N,N'-di-(phenyl)-N-hydroxy thiourea, M.P. 110° C. (dec.).

*Analysis.*—Calcd. for $C_{13}H_{12}N_2OS$ (percent): N, 11.48; S, 13.10. Found (percent): N, 11.60; S, 13.00.

EXAMPLE 3

A mixture of 1.23 g. of p-tolyl hydroxylamine and 0.3 ml. carbon disulfide in 1 ml. dimethylformamide was stirred at room temperature for 2 hours. The carbon disulfide was evaporated and 20 ml. water added to the residue. Filtration provided a solid product which was crystallized from ethyl ether/petroleum ether (B.P. 30°–60° C.) to yield 0.76 g. N,N'-di-(p-tolyl)-N-hydroxy thiourea, M.P. 108° C.

*Analysis.*—Calcd. for $C_{15}H_{16}N_2OS$ (percent): N, 10.29; S, 11.77. Found (percent): N, 10.21; S, 11.42.

What is claimed is:
1. A process for preparing selected N,N'-disubstituted-N-hydroxy thioureas which comprises reacting an hydroxylamine having the formula RNHOH wherein R is cycloaliphatic having 5 to 8 carbon atoms, phenyl, halophenyl, cyanophenyl, nitrophenyl, lower alkoxyphenyl, tolyl or xylyl with carbon disulfide in the presence of a partially water-soluble or water-miscible aprotic solvent at a temperature of about 0° to about 45° C.

2. The process of claim 1 wherein a cycloaliphatic hydroxylamine having 5 to 6 carbon atoms is employed as the hydroxylamine.

3. The process of claim 2 wherein cyclohexyl hydroxylamine is employed as the hydroxylamine.

4. The process of claim 1 wherein phenyl hydroxylamine is employed as the hydroxylamine.

5. The process of claim 1 wherein p-tolyl hydroxylamine is employed as the hydroxylamine.

References Cited

Beckmann: J. Prakt. Chemie 164, 71 (1897).

U.S. Cl. X.R.

260—465, 563, 577, 580